United States Patent
Sato

(10) Patent No.: US 12,238,269 B2
(45) Date of Patent: Feb. 25, 2025

(54) INFORMATION PROCESSING APPARATUS, INFORMATION PROCESSING METHOD, AND STORAGE MEDIUM THAT PERFORM DRAWING USING SHAPE DATA ASSOCIATED WITH OBJECTS SET AS DRAWING TARGETS, BASED ON A GENERATED CAMERA PATH AND METADATA ADDED TO VOLUMETRIC VIDEO

(71) Applicant: CANON KABUSHIKI KAISHA, Tokyo (JP)

(72) Inventor: Tomokazu Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 226 days.

(21) Appl. No.: 17/968,882

(22) Filed: Oct. 19, 2022

(65) Prior Publication Data

US 2023/0156177 A1   May 18, 2023

(30) Foreign Application Priority Data

Nov. 15, 2021  (JP) ................................ 2021-185839

(51) Int. Cl.
| | |
|---|---|
| *H04N 13/351* | (2018.01) |
| *G06T 7/246* | (2017.01) |
| *G06T 7/50* | (2017.01) |
| *G06T 7/70* | (2017.01) |
| *G06T 17/20* | (2006.01) |

(52) U.S. Cl.
CPC .......... *H04N 13/351* (2018.05); *G06T 7/246* (2017.01); *G06T 7/50* (2017.01); *G06T 7/70* (2017.01); *G06T 17/20* (2013.01)

(58) Field of Classification Search
None
See application file for complete search history.

(56) References Cited

U.S. PATENT DOCUMENTS

| | | | |
|---|---|---|---|
| 6,711,590 B1 | 3/2004 | Lennon | |
| 2018/0136332 A1* | 5/2018 | Barfield, Jr. ....... | G06V 10/7784 |

(Continued)

FOREIGN PATENT DOCUMENTS

| | | | |
|---|---|---|---|
| JP | 2000-106661 A | 4/2000 | |
| WO | WO-2021232329 A1 * | 11/2021 | ............. G06T 7/292 |

*Primary Examiner* — Andrew G Yang
(74) *Attorney, Agent, or Firm* — Venable LLP

(57) ABSTRACT

An information processing apparatus obtains volumetric video data (VDD) of frames, including object shape data, the VDD including metadata associating the objects and the shape data in each frame, selects a specific object based on the VDD, generates a camera path indicating a movement path of a virtual viewpoint from which it is possible to visually recognize the selected specific object favorably, based on at least information on a three-dimensional position or an attribute of the object included in the metadata and a circumscribed rectangle of a three-dimensional shape indicated by the shape data, sets an object at least including the selected specific object as a drawing target based on the metadata added to the VDD, and performs drawing using the shape data associated with the one or the plurality of objects set as the drawing target, based on the generated camera path and the metadata added to the VDD.

7 Claims, 15 Drawing Sheets

(56) References Cited

U.S. PATENT DOCUMENTS

| | | | |
|---|---|---|---|
| 2019/0043207 A1* | 2/2019 | Carranza | G06V 20/52 |
| 2019/0156123 A1* | 5/2019 | Chiang | G06F 18/2411 |
| 2019/0236827 A1* | 8/2019 | Hakura | G06T 17/10 |
| 2021/0174079 A1* | 6/2021 | Wang | G06V 20/52 |
| 2022/0076447 A1* | 3/2022 | He | G06V 20/64 |
| 2022/0129669 A1* | 4/2022 | Devassy | G06V 40/10 |
| 2022/0256134 A1* | 8/2022 | Chupeau | H04N 19/46 |

* cited by examiner

|  | Frame Number | | | | | |
|---|---|---|---|---|---|---|
| Object Index | | 0 | 1 | 2 | 3 | 4 | 5 |
| | 001 | 00 | 00 | 00 | 01 | 00 | 02 |
| | 002 | -1 | 03 | 02 | 00 | 01 | 01 |
| | 003 | 01 | 02 | 01 | 02 | 02 | 00 |
| | 004 | 02 | 01 | 00 | 03 | 01 | 03 |

FIG.5A

Object
Index:001
Attribute:person
Tag:Goto, team A, 12

Object
Index:002
Attribute:person
Tag:Shimizu, team B, 12

Object
Index:003
Attribute:person
Tag:Sasaki, team A, 5

Object
Index:004
Attribute:thing
Tag:ball

FIG.5B

INFORMATION PROCESSING APPARATUS, INFORMATION PROCESSING METHOD, AND STORAGE MEDIUM THAT PERFORM DRAWING USING SHAPE DATA ASSOCIATED WITH OBJECTS SET AS DRAWING TARGETS, BASED ON A GENERATED CAMERA PATH AND METADATA ADDED TO VOLUMETRIC VIDEO

CROSS-REFERENCE TO PRIORITY APPLICATION

This application claims the benefit of Japanese Patent Application No. 2021-185839, filed Nov. 15, 2021 which is hereby incorporated by reference herein in its entirety.

BACKGROUND

Field of the Disclosure

The present disclosure relates to the file format of a volumetric video.

Description of the Related Art

Japanese Patent Laid-Open No. 2000-106661 has disclosed, for the purpose of analyzing a sports highlight scene, and the like, a method of associating tracking information representing the position and the time of an object with each frame of a moving image as metadata.

In recent years, a volumetric video technique has been attracting attention, which is capable of generating videos from a variety of angles within a virtual space created in a computer by generating three-dimensional (3D) data of the entire image capturing space. In this volumetric video, it is possible for a viewer him/herself to control the viewpoint (position, orientation, viewing angle, and the like, of a virtual camera, in the following, called a "virtual viewpoint") at the time of viewing. Here, for example, in order to implement preferable viewing in a volumetric video that takes a soccer game played in a wide space, such as a stadium, as a target, it is necessary to control the virtual viewpoint at all times in accordance with a scene desired to be viewed. Specifically, detailed control for tracking the movement of the player of interest, maintaining the ball within the viewing angle, and so on is necessary. Further, for the volumetric video, in a case when only a specific object is viewed, processing to selectively draw only the specific object is necessary, in addition to the virtual viewpoint control.

In the data of a volumetric video, generally, in one frame, shape data representing the three-dimensional shape of an object is included corresponding to the number of objects captured therein. Then, at the time of selectively drawing the specific object in accordance with the input virtual viewpoint, it is necessary to determine how to process the shape data, and therefore, it is not possible to deal with this only by associating tracking information with each frame by the method of Japanese Patent Laid-Open No. 2000-106661 described above.

SUMMARY OF THE DISCLOSURE

An object of the present disclosure is to make it possible to easily perform selective drawing of a specific object.

The information processing apparatus according to the present disclosure includes one or more memories storing instructions, and one or more processors executing the instructions to obtain volumetric video data consisting of a sequence of frames, each frame including object shape data, to obtain tracking information indicating a change of each object between frames, each object corresponding to the shape data to generate metadata that associates each of the objects and the shape data in each frame based on the tracking information, and to output the volumetric video data including the metadata.

Further features of the present disclosure will become apparent from the following description of exemplary embodiments with reference to the attached drawings.

BRIEF DESCRIPTION OF THE DRAWINGS

FIG. 5A is a diagram showing an example of object list information and FIG. 5B is a diagram showing an example of metadata;

DESCRIPTION OF THE EMBODIMENTS

Hereafter, with reference to the attached drawings, the present disclosure is explained in detail in accordance with preferred embodiments. Configurations shown in the following embodiments are merely exemplary and the present disclosure is not limited to the configurations shown schematically.

Before giving explanation of embodiments, the concept of "volumetric video" is reviewed. In the present specification, the volumetric video is a video in a case when shape data indicating a three-dimensional shape (also called a "3D model") of an object is generated and arranged on a virtual space, and, then, the shape data is viewed from a virtual viewpoint. Volumetric video data refers to data recording shape data representing a three-dimensional shape of an object in place of conventional two-dimensional video data, but is not limited to this. It may also be possible to record shape data along with voice data, or take video data, which is a video in a case when the shape data of an object is viewed from a virtual viewpoint, as volumetric video data.

The 3D model has a variety of data formats, such as volume data representing the shape of an object by voxels, point cloud data representing it by a set of points, and mesh data representing it by a set of polygons. In the present embodiment, an explanation is given by using mesh data, but the 3D model data format is not limited to this. Further, there is a case where the 3D model further has color information. For example, generally, in a case of volume data, each voxel has information on color and transparency, in a case of point cloud data, each point has color information, and, in a case of mesh data, each mesh has texture information.

In the volumetric video, one or more 3D models representing the three-dimensional shape of one or more objects are associated with each frame. By a frame sequence in which those frames are arranged in a time series, information relating to the shape of an object captured therein is retained. As the volumetric video such as this, for example, there is "High-quality Streamable free-viewpoint video" of Microsoft (registered trademark). This stores a texture image in the video track of the MPEG-DASH protocol as a moving image and stores a 3D model in the mesh format in the extended NAL (Network Abstraction Layer) unit.

First Embodiment

<Hardware Configuration>

Figure 1:
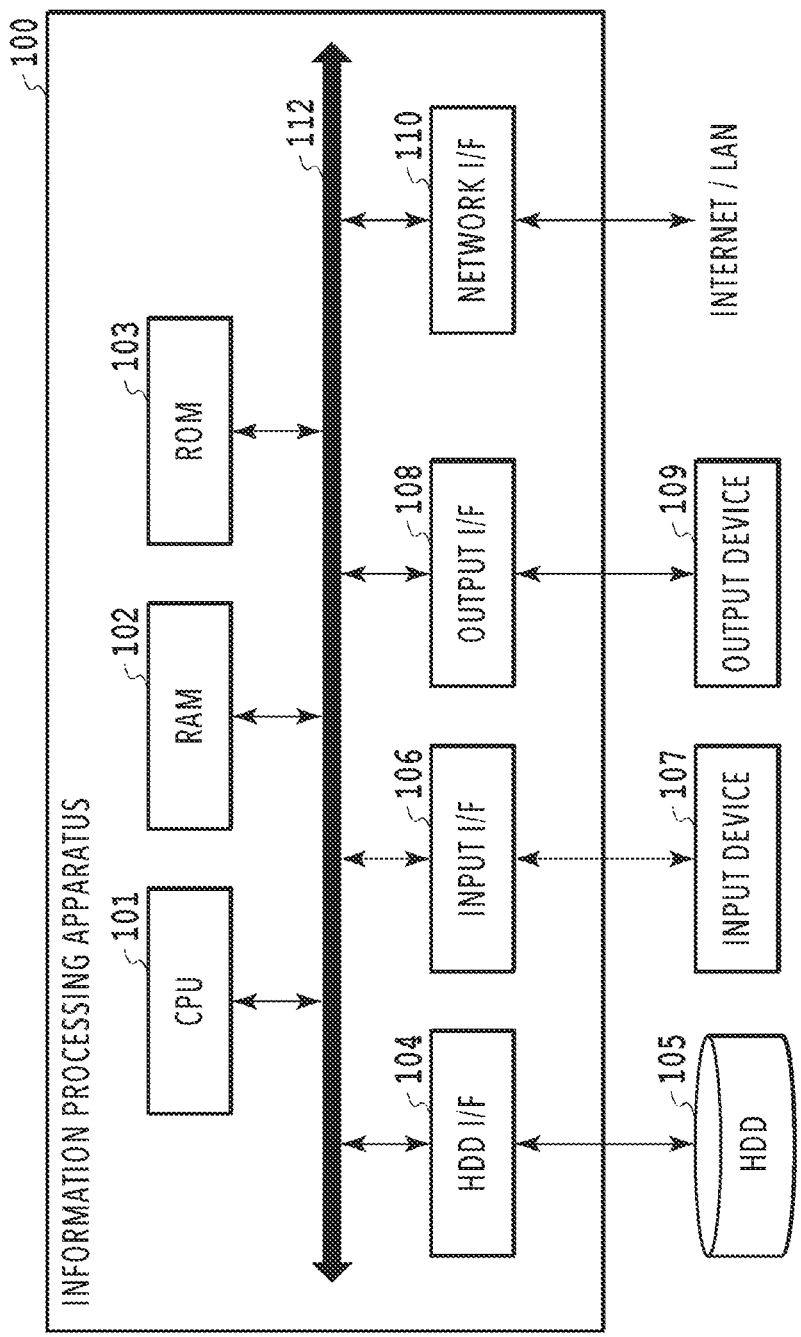
FIG. 1 is a diagram showing an example of a hardware configuration of an information processing apparatus.

FIG. 1 is a diagram showing an example of the hardware configuration of an information processing apparatus 100 according to the present embodiment. In FIG. 1, a CPU 101 controls the operation of each block, to be described later, via a system bus 112 by executing programs stored in a ROM 103 and a hard disk drive (HDD) 105 by using a RAM 102 as a work memory. An HDD I/F 104 is an interface, for example, such as serial ATA (SATA), which connects a secondary storage device, such as the HDD 105 and an optical disk drive. It is possible for the CPU 101 to read data from the HDD 105 and to write data to the HDD 105 via the HDD I/F 104. Further, it is possible for the CPU 101 to load the data stored in the HDD 105 onto the RAM 102 and, on the contrary, to store the data loaded onto the RAM 102 in the HDD 105, as well. Then, it is possible for the CPU 101 to execute the data loaded onto the RAM 102 as a program. An input I/F 106 is a serial bus interface, for example, such as USB and an IEEE 1394, which connects an input device 107, such as a keyboard, a mouse, a digital camera, and a scanner. It is possible for the CPU 101 to read data from the input device 107 via the input I/F 106. An output I/F 108 is a video output interface, for example, such as DVI and HDMI (registered trademark), which connects the information processing apparatus 100 and a display, which is an output device. It is possible for the CPU 101 to send data to the display via the output I/F 108 and to cause the display to display a predetermined video. A network I/F 110 is an interface that connects with a network, such as the internet and LAN. It is possible for the CPU 101 to perform transmission and reception of various kinds of data with an external server, and the like, connected to a LAN or the internet via the network I/F 110.

<Function Configuration and Flow of Processing>

Figure 2:
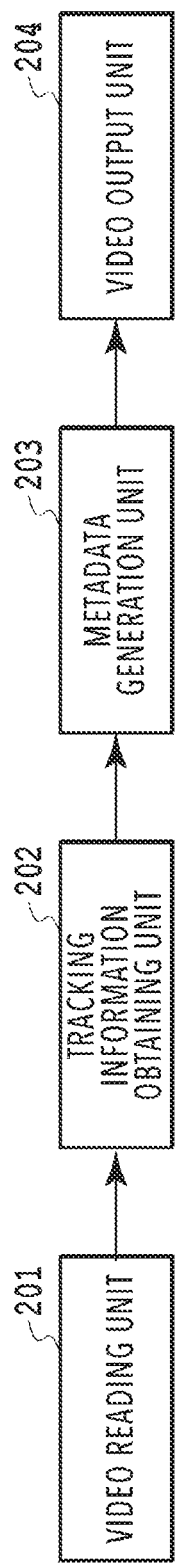
FIG. 2 is a block diagram showing a software configuration of the information processing apparatus.
Figure 3:
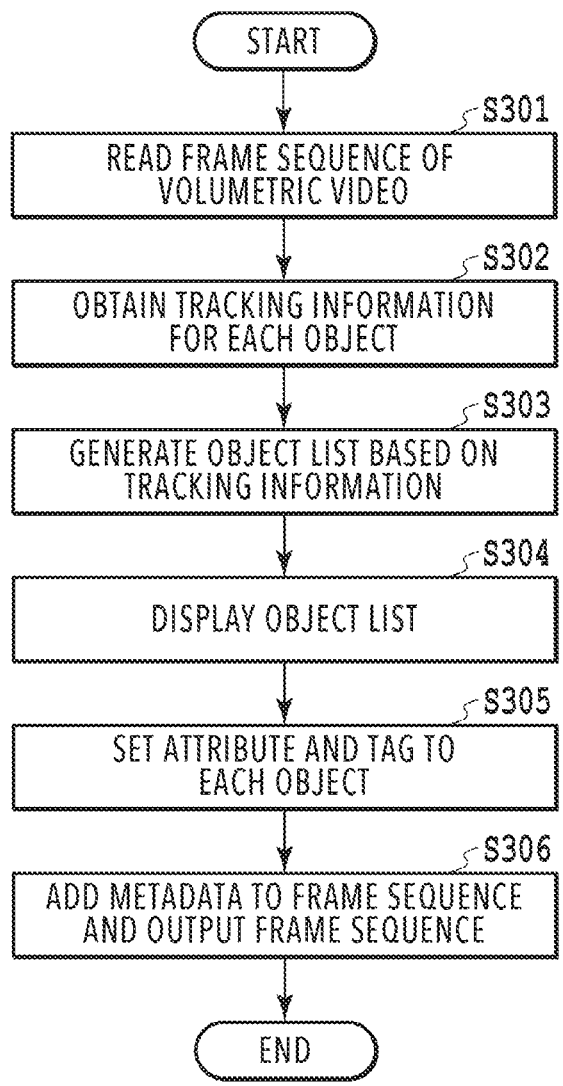
FIG. 3 is a flowchart showing a flow of processing to add metadata to a volumetric video.
Figure 6:
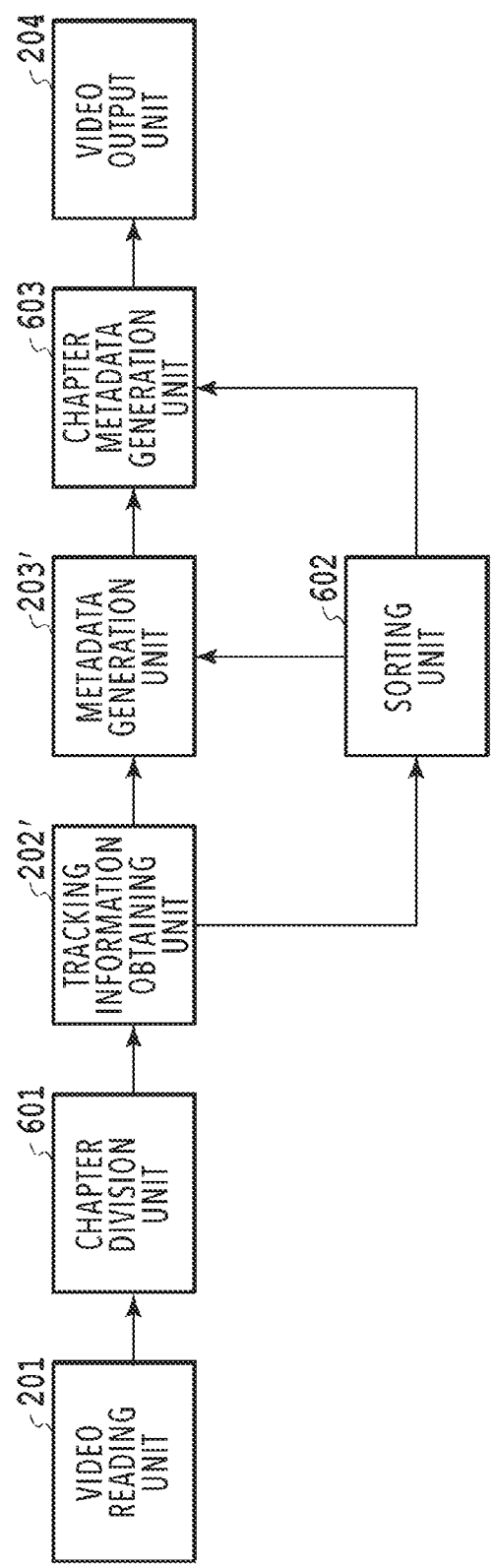
FIG. 6 is a block diagram showing a software configuration of an information processing apparatus.
Figure 7:
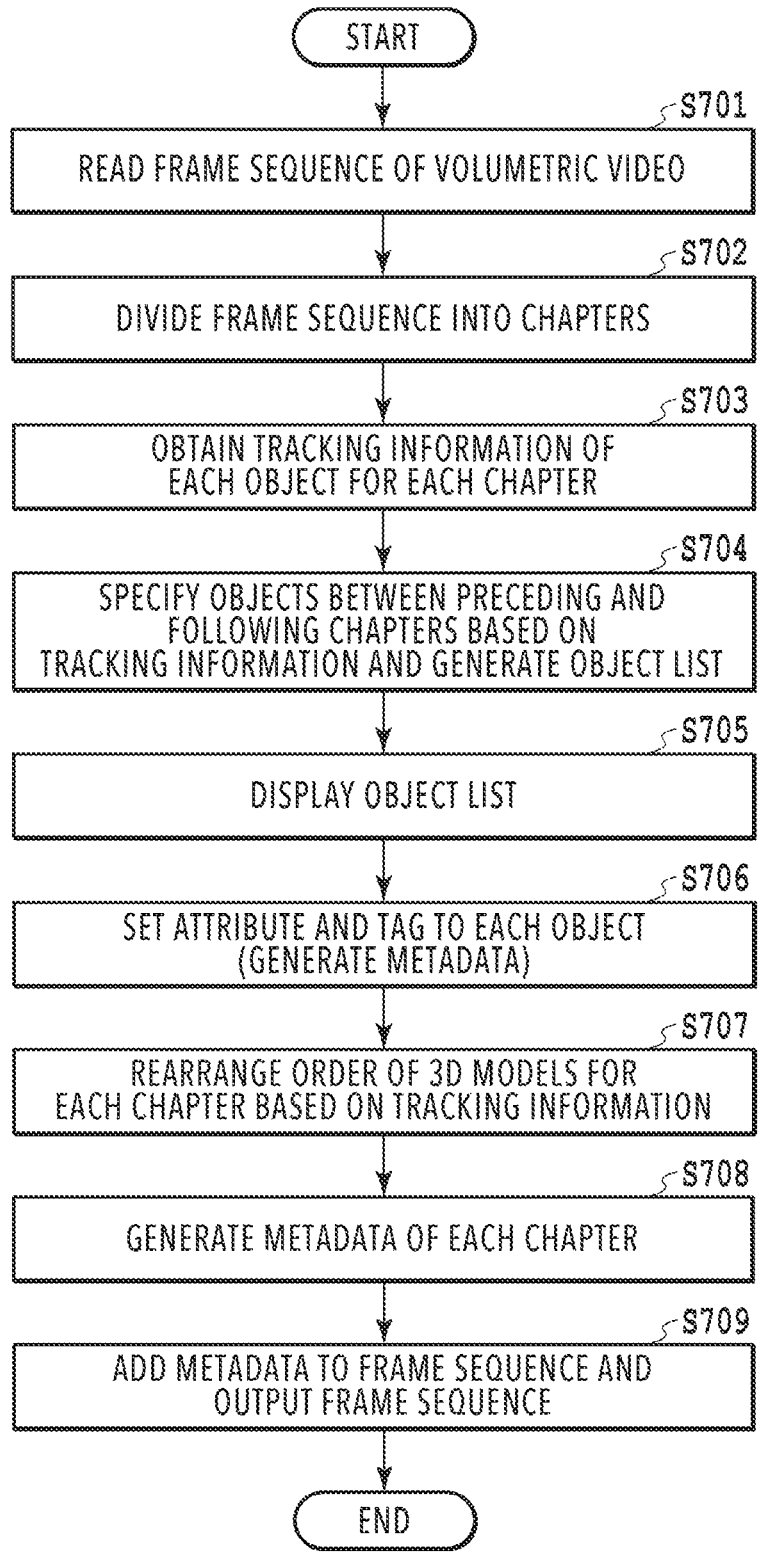
FIG. 7 is a flowchart showing a flow of processing to add metadata to a volumetric video.

FIG. 2 and FIG. 6 are each a block diagram showing the software configuration of the information processing apparatus 100, and, in more detail, a block diagram showing the function configuration for adding metadata suitable to selective drawing of a specific object to a volumetric video. The various functions shown in FIG. 2 and FIG. 6 are implemented by the CPU 101 executing dedicated programs and the type of metadata to be generated is different between FIG. 2 and FIG. 6. Further, FIG. 3 and FIG. 7 are each a flowchart showing a flow of processing to add the above-described metadata to the volumetric video and correspond to FIG. 2 and FIG. 6, respectively.

<<Type 1>>

First, processing to add metadata suitable to selective drawing of a specific object, which is implemented by the function configuration shown in the block diagram in FIG. 2, is explained with reference to the flowchart in FIG. 3. In the following explanation, a symbol "S" means a step.

At S301, a video reading unit 201 reads a frame sequence of a processing-target volumetric video from the HDD 105 or the like. In each frame constituting the frame sequence that is read here, data of a two-dimensional (2D) image at a specific time and data of a 3D model of an object captured in the 2D image are included. In this case, on a condition that a plurality of objects is captured within the 2D image, each 3D model represents a three-dimensional shape of a single object in principle. However, in a case when a plurality of objects are in close proximity with one another, such as in touch with one another, the 3D model represents a three-dimensional shape of the plurality of objects integrated with one another.

Figure 4A:
FIG. 4A and FIG. 4B are each a schematic diagram showing the way objects are tracked.
Figure 4B:

At S302, a tracking information obtaining unit 202 performs extraction of objects and tracking of each object for the 2D image in each frame constituting the frame sequence read at S301. For example, in a case when three players and a ball are captured within the 2D image, the four objects are extracted and the 3D model of each frame are analyzed, and, then, the correspondence relationship between frames is found for each of the four objects. At this time, there is a case when the 3D model and the object are not in a one-to-one relationship. For example, the 3D model, at the instant at which the player touches the ball, represents one three-dimensional shape of the player and the ball coupled to each other. As described above, there is a case when a plurality of objects is allocated to one 3D model, and, therefore, caution should be taken. FIG. 4A and FIG. 4B are each a schematic diagram showing the way objects are tracked. FIG. 4A shows the 3D model in the mesh format (in the following, described as a "mesh model") corresponding to six frames in the captured image scene in which three players and a ball are captured. Further, FIG. 4B shows the results of tracking of one player (person) and the ball by solid-line arrows and broken-line arrows, respectively. As regards the person, in each of frames whose Frame Numbers are zero to five, each Model Index of "00", "00", "00", "01", "00", and "02" is appended to each mesh model. Further, as regards the ball, in each of frames whose Frame Numbers are zero to five, each Model Index of "02", "01", "00", "03", "01", and "03" is appended to each mesh model. Here, it should be noted that the person and the ball are represented by one mesh model in the second frame. The results of object tracking thus obtained are supplied to a metadata generation unit 203 as tracking information indicating the transition of each object between frames.

At S303, the tracking information obtaining unit 202 generates list information on objects captured in the 2D image of the frame sequence based on the tracking information obtained at S302. FIG. 5A shows an example of list information on objects. In the list information shown in FIG. 5A, Object Indexes (here, "001" to "004") that identify each of the four objects shown in FIG. 4A are appended, and each Object Index and Model Index in each frame are associated with each other. For Object Index "002", Model Index of the zeroth frame is "−1" and this means that the relevant player object does not exist in the zeroth frame.

At S304, the list information generated at S303 is displayed on the display (output device 109). At this time, the representative mesh model (for example, a mesh model whose surface area is the greatest), corresponding to each object index, is also displayed.

At next, S305, the metadata generation unit 203 sets an attribute and a tag for each object described in the list information and generates metadata that is added to the frame sequence. In the present embodiment, an operator refers to the list information and the representative mesh model, which are displayed on the display, and inputs "person" or "thing" other than person as "Attribute" by operating a keyboard, or the like. Further, as "Tag", the operator inputs identification information for distinguishing between objects having the same attribute by operating a keyboard, or the like. Then, based on the input results, the contents of "Attribute" and "Tag" are set for each object represented by Object Index as shown in FIG. 5B. In the example in FIG. 5B, Object Indexes "001" to "003" correspond to each player and Object Index "004" corresponds to the ball. In this case, the operator designates "person" as its "Attribute" for each Object Index of "001" to "003" and, further, additionally writes information unique to the player, such as the name of the person (player), the name of the team the player belongs, and the player's uniform number, as "Tag". Further, for Object Index of "004", "thing" is designated as its "Attribute" and information, such as a common noun (here, ball), specifically indicating what it is, is written additionally as "Tag". Due to this, it is made possible to specify the relevant mesh model only by designating the contents of "Attribute" and "Tag". In this manner, information on "Attribute" and "Tag" set for each Object Index is obtained as metadata. It may also be possible to perform automatic setting by analyzing, for example, the 2D image within the frame or the mesh model, in place of the operator manually inputting the information on attribute and tag. Specifically, a method is conceived that automatically sets the contents of "Attribute" and "Tag" based on the results obtained by performing character detection, face recognition, detection of the size, and color of the shape represented by the mesh model, and the like. Further, it may also be possible to enable an operator to edit the results obtained by performing the automatic setting, such as this, by displaying the results on the display.

At 306, a video output unit 204 adds the metadata obtained at S305 to the frame sequence read at S301 and outputs the frame sequence.

As described above, it is possible to obtain a volumetric video to which metadata suitable to selective drawing of a specific object is added.

<<Type 2>>

Next, processing to add metadata suitable to selective drawing of a specific object, which is implemented by the function configuration shown in the block diagram in FIG. 6, is explained with reference to the flowchart in FIG. 7. In the following explanation, a symbol "S" means a step. At S701, as at S301 in the flow in FIG. 3, the video reading unit 201 reads the frame sequence of a processing-target volumetric video from the HDD 105, or the like.

At next, S702, a chapter division unit 601 divides the frame sequence read at S701 into a plurality of chapters. The chapter division unit 601 determines, for example, a group of frames as a chapter section, which is an aggregate of frames continuous in terms of time, such as a play between each delimitation, by performing scene analysis for the input frame sequence, and so on, and divides the frame sequence into chapters. For example, the six frames shown FIG. 4A described previously, which is explained in <<Type 1>>, form one chapter. The chapter section determination method is not limited to this. For example, it may also be possible for an operator to designate a chapter section with a mouse, and the like, while reproducing the processing-target frame sequence, or for a person to modify the chapter section automatically generated by scene analysis, or to delimit the sequence frame at regular time intervals determined in advance.

At S703, a tracking information obtaining unit 202' performs object extraction by taking each divided chapter as a target and performs tracking of each extracted object. The object specified by being extracted and tracked within the specific chapter in this manner is called a "chapter object". The results of tracking of each chapter object obtained at this step are supplied to a metadata generation unit 203' and a sorting unit 602 as tracking information.

At S704, the tracking information obtaining unit 202 performs identification of chapter objects between the preceding chapter and the following chapter based on the tracking information obtained at S703, and generates list information on the identified chapter objects. Specifically, in two chapters adjacent to each other, the position of each chapter object in the last frame of the preceding chapter and the position of each chapter object in the top frame of the following chapter are analyzed, and the chapter objects whose positions are close to each other are identified to be the same object.

Figure 8:
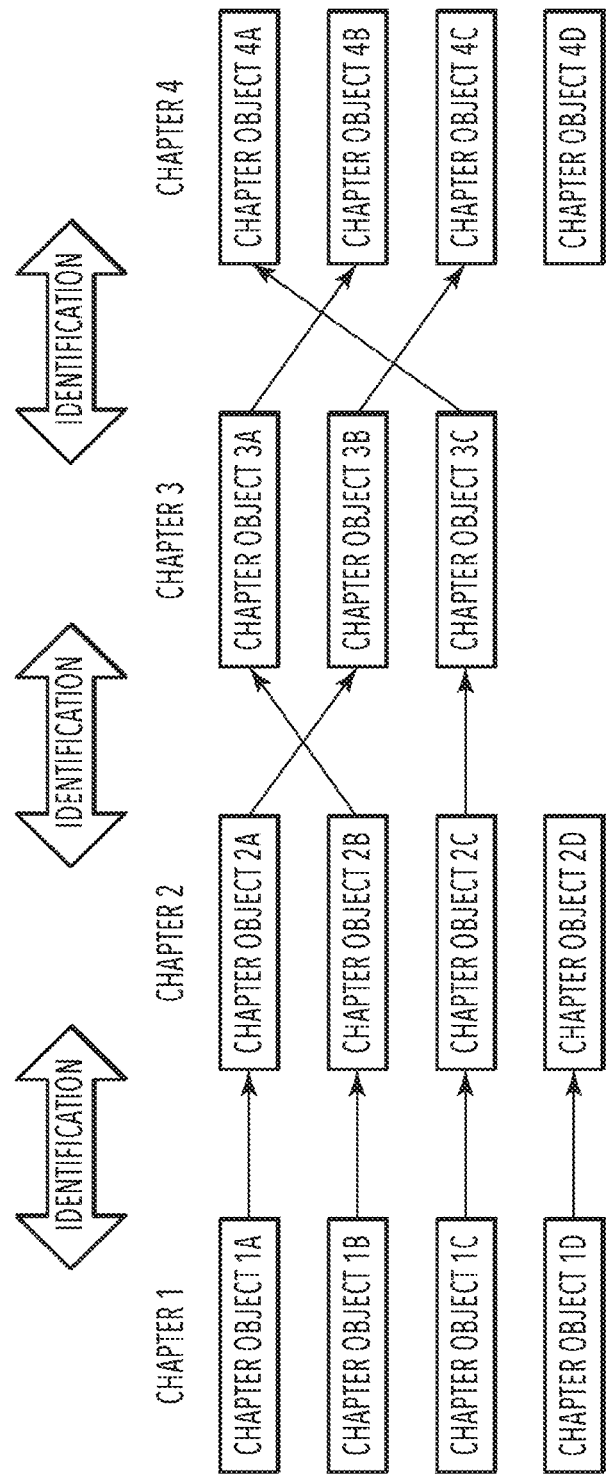
FIG. 8 is a diagram explaining identification of chapter objects.

FIG. 8 is a diagram explaining identification of chapter objects. As shown in FIG. 8, in a case of division into four chapters, identification is performed for the set of chapter one and chapter two, the set of chapter two and chapter three, and the set of chapter three and chapter four. In the example in FIG. 8, a chapter object 1A, a chapter object 2A, a chapter object 3B, and a chapter object 4C are identified to be the same object. Similarly, a chapter object 1B, a chapter object 2B, a chapter object 3A, and a chapter object 4B are identified to be the same object. Similarly, a chapter object 1C, a chapter object 2C, a chapter object 3C, and a chapter object 4A are identified to be the same object. Similarly, a chapter object 1D and a chapter object 2D are identified to be the same object. The chapter object thus identified to be the same object across a plurality of chapters is called "global object". The method of identifying objects to be the same among chapters is not limited to the above-described method, and, for example, it may also be possible to use the size (surface area, number of polygons) of the mesh model, and the like. Then, for the global object identified as described above, list information similar to that in FIG. 5A described previously is generated. That is, an object index identifying each identified global object is appended, and each object index and the model index in each frame are associated with each other.

A S705, as at S304 in the flow in FIG. 3, global object list information generated at S704 is displayed on the display (output device 109). At that time, the representative mesh model (for example, a method model whose surface area is the greatest), indicated by each object index is also displayed.

Figure 9:
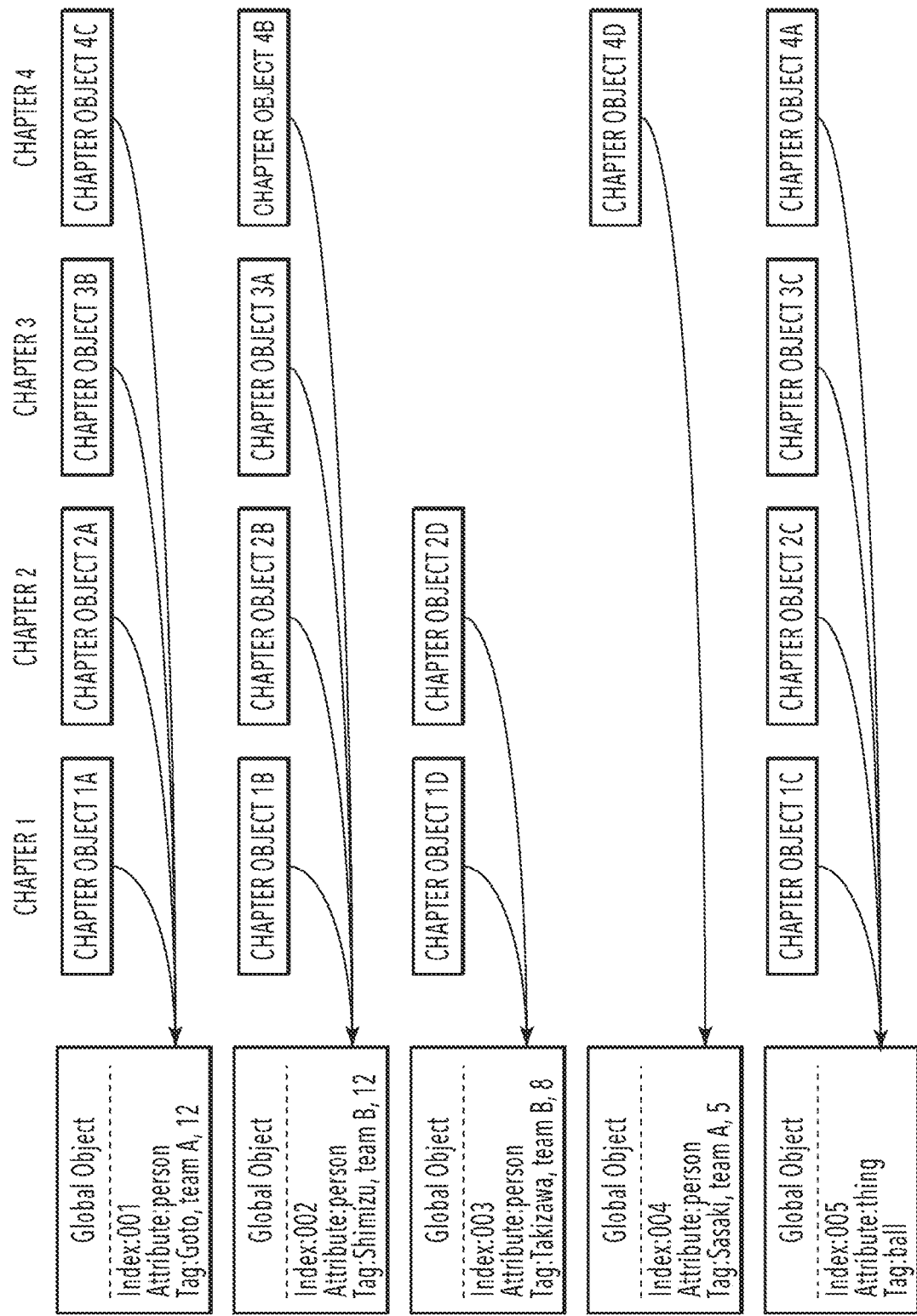
FIG. 9 is a diagram showing an example of metadata.

At S706, the metadata generation unit 203' sets an attribute and a tag for each global object described in the global object list information and generates metadata that is added to the frame sequence. As at S305 in the flow in FIG. 3, an operator refers to the list information and the representative mesh model, which are displayed on the display, and inputs information indicating details thereof, such as whether a person or a thing as "Attribute" and the name and the team to which it belongs as "Tag", by operating a keyboard, and the like. Then, based on the input results, the contents of "Attribute" and "Tag" are set for each Global Object identified by Object Index as shown in FIG. 9. In the example in FIG. 9, Object Indexes "001" to "004" correspond to each player, and Object Index "005" corresponds to the ball. In this case, for Global Object indicated by each Object Index of "001" to "004", the operator designates "person" as "Attribute" thereof. Further, the operator additionally writes information unique to the player, such as the name of the person (player), the name of the team the player belongs, and the uniform number, as "Tag". Furthermore, for Object Index of "005", the operator designates "thing" as "Attribute" and, further, additionally writes information, such as a common noun (here, a ball), with which it is known what the object is specifically as "Tag". Due to this, it is made possible to specify the relevant mesh model by only designating the contents of "Attribute" and "Tag". In this manner, information on "Attribute" and "Tag" set for each Object Index of Global Object is obtained as metadata.

At S707, the sorting unit 602 performs processing to rearrange the order of the 3D models in each chapter based on the tracking information obtained at S703. In the rearrangement processing of the present embodiment, the surface area of the mesh model corresponding to each chapter object is estimated, the order is changed so that the mesh models are arranged in order from the mesh model whose surface area is the greatest, and the model index is also changed.

Figure 10:
FIG. 10 is a diagram showing an example of results of rearrangement processing.

FIG. 10 shows the results of performing the rearrangement processing in a case when it is assumed that the six frames shown in FIG. 4A described previously form one chapter. Here, in a case when a plurality of chapter objects is in contact with one another and represented by one mesh model, association is established with the chapter object whose percentage of the area to the total surface area is the highest. In the example in FIG. 10 also, for a mesh model 1001, in which the player and the ball are integrated, the percentage of the portion representing the player shape is larger, and, therefore, association is established with the chapter object side of the player (Model Index "00").

At S708, a chapter metadata generation unit 603 generates metadata of a 3D model for which rearrangement processing for each chapter has been performed. In a case of the present embodiment, in which the mesh model is adopted as a 3D model, processing as follows is performed. First, a chapter of interest is selected, and for each model index in the chapter, the maximum number of polygons, the maximum number of vertexes, and the circumscribed rectangle of the mesh model in each frame are found, and metadata associated with each mesh model is generated.

Figure 11:
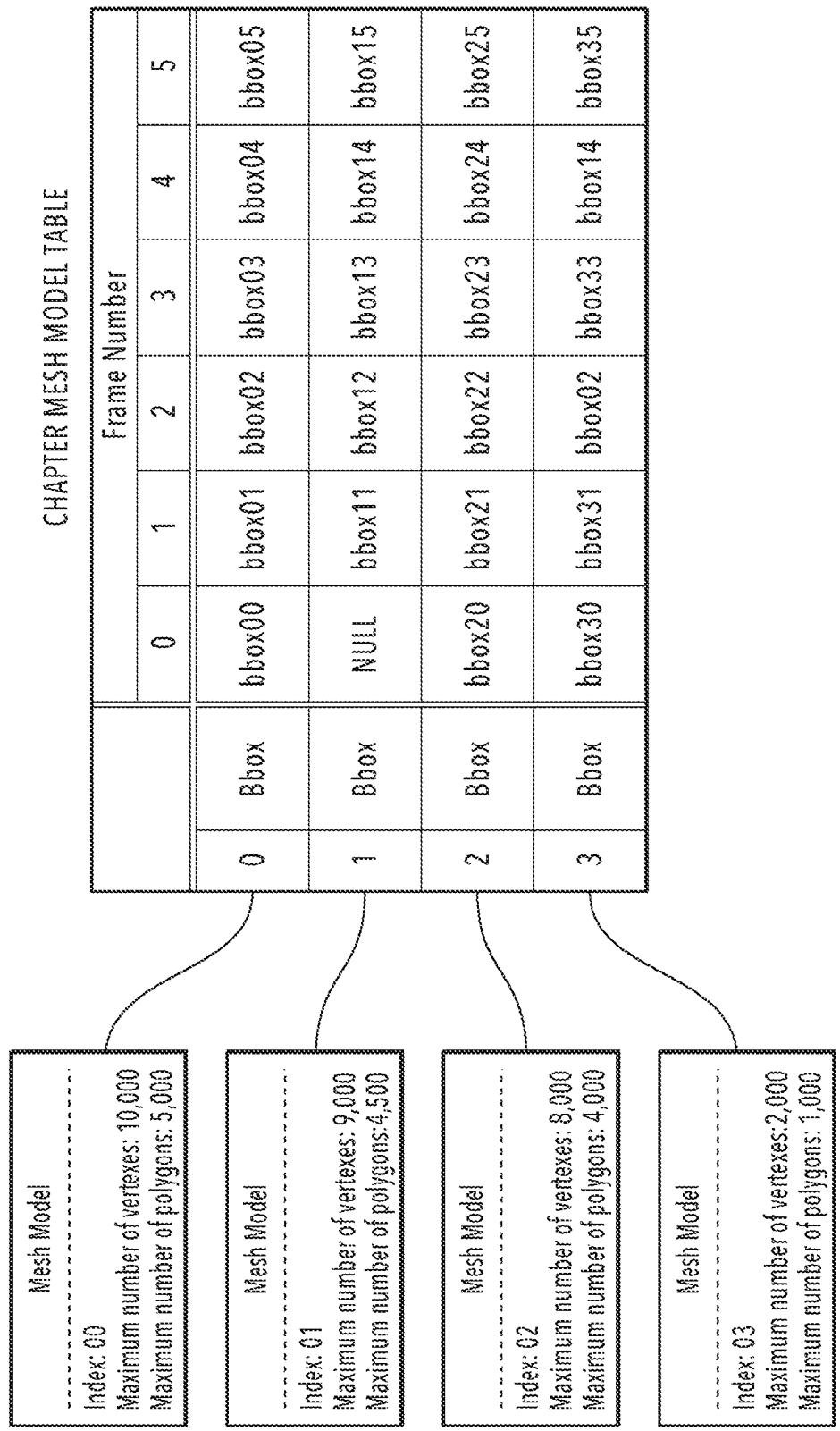
FIG. 11 is a diagram showing an example of metadata.

FIG. 11 shows the data structure of "chapter mesh model table" that is generated as metadata of each mesh model. In the chapter mesh model table shown in FIG. 11, "Bbox" means the circumscribed rectangle (bounding box) of the mesh model and is associated with the model index. By the chapter mesh model table such as this, it is made possible to efficiently draw a mesh model. For example, by the maximum number of vertexes and the maximum number of polygons, it is possible to grasp the buffer size for mesh processing. Further, by the circumscribed rectangle of each frame, it is possible to efficiently perform culling (technique to invalidate rendering of an object in a case when the object is hidden by another object and cannot be recognized visually from a virtual viewpoint) at the time of rendering. Furthermore, the chapter metadata generation unit 603 generates the index of the global object corresponding to the chapter object and the three-dimensional position information and the model index of each frame as metadata associated with each chapter object. At this time, in a case when the mesh model corresponds to a plurality of objects, the integrated state of the objects is analyzed and information on the objects in the integrated relationship is also included in the metadata.

Figure 12:
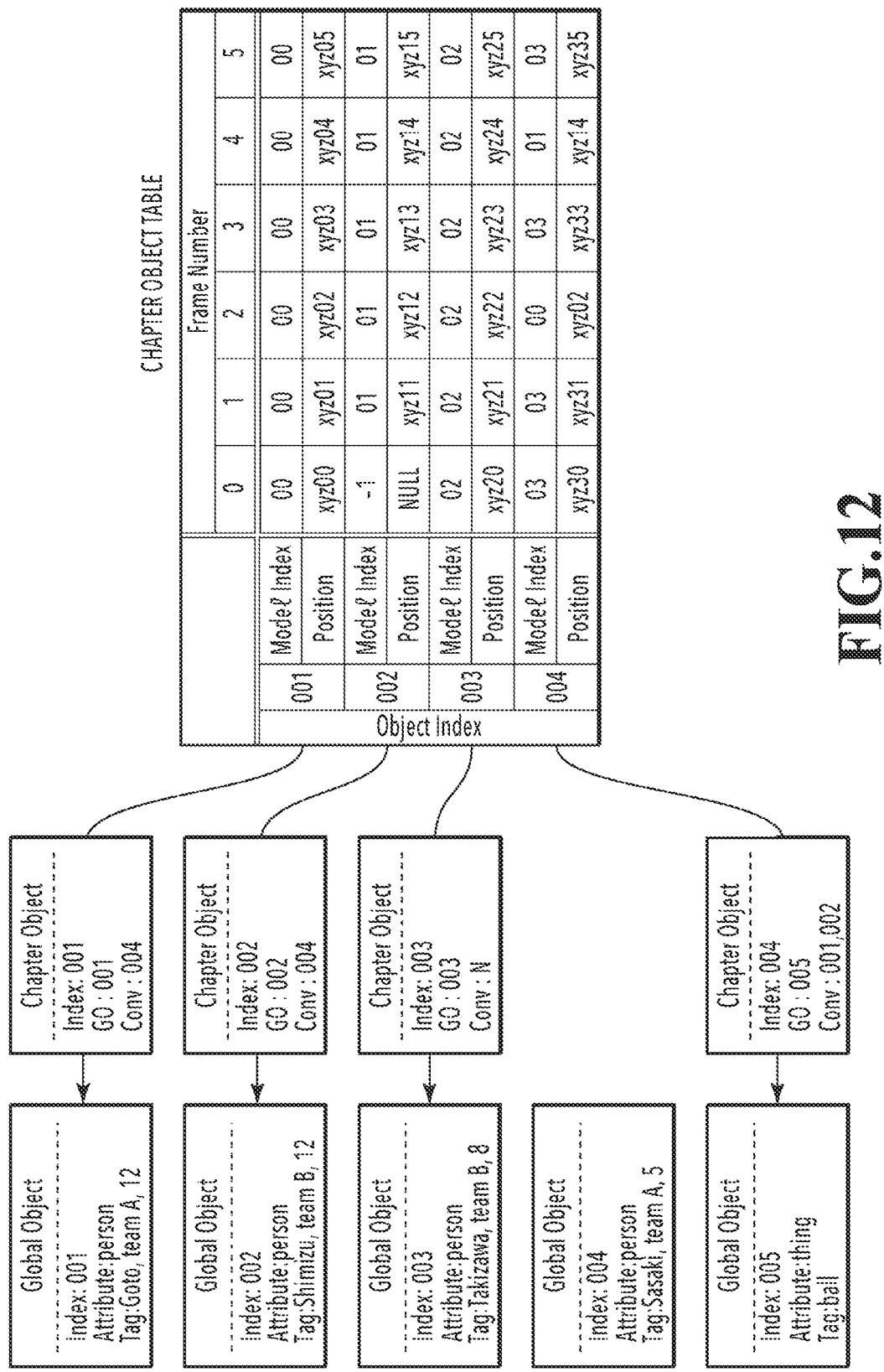
FIG. 12 is a diagram showing an example of metadata.

FIG. 12 shows the data structure of "chapter object table" that is generated as metadata for each chapter object of the chapter of interest for which the rearrangement processing has been performed (see FIG. 10 described previously). As shown in FIG. 12, ancillary information "GO" for grasping the global object from the chapter object and ancillary information "CONV" for grasping another chapter object, which is the partner of integration in a case when they are in the integrated relationship, are added. In this case, in "GO", the index of the global object is described and, in "Conv", the index of another chapter object that is integrated is described.

At S709, the video output unit 204 adds the metadata obtained at S706 and S708 to the frame sequence consisting of each chapter for which the rearrangement processing has been performed at S707 and outputs the frame sequence.

The above is the operation of each unit and the flow of the time-series processing for generating the type 2 metadata-added volumetric video.

In the volumetric video having the type 2 format, division and management of each chapter is enabled and, further, it is possible to efficiently mange the 3D model in such a manner of capable of dealing with exchange of objects among chapters. Furthermore, by arranging mesh models based on tracking results of each object and adding metadata to each mesh model, more efficient rendering is enabled.

Selective Reproduction of Object>

Following the above, by taking the case of the above-described type 2 as an example, a method of selectively reproducing an arbitrary object by utilizing metadata added to the volumetric video is explained.

Figure 13B:
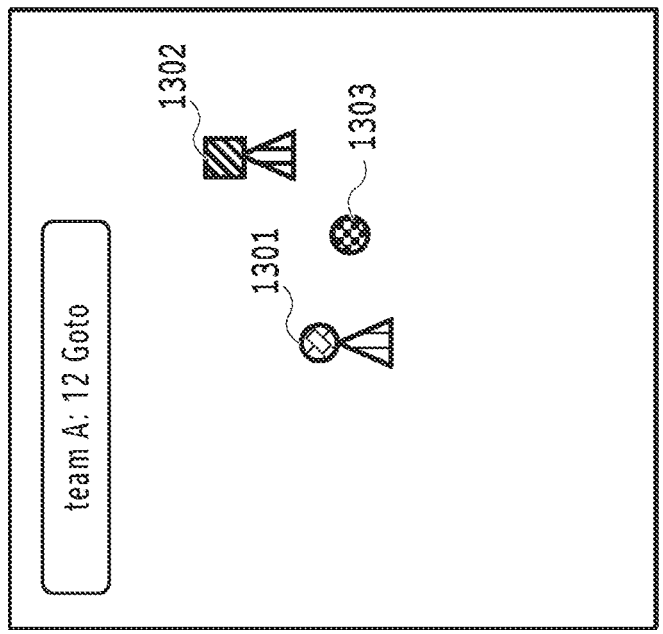
FIG. 13A and FIG. 13B are each a diagram showing an example of a user interface (UI) screen that an operator uses.
Figure 13A:
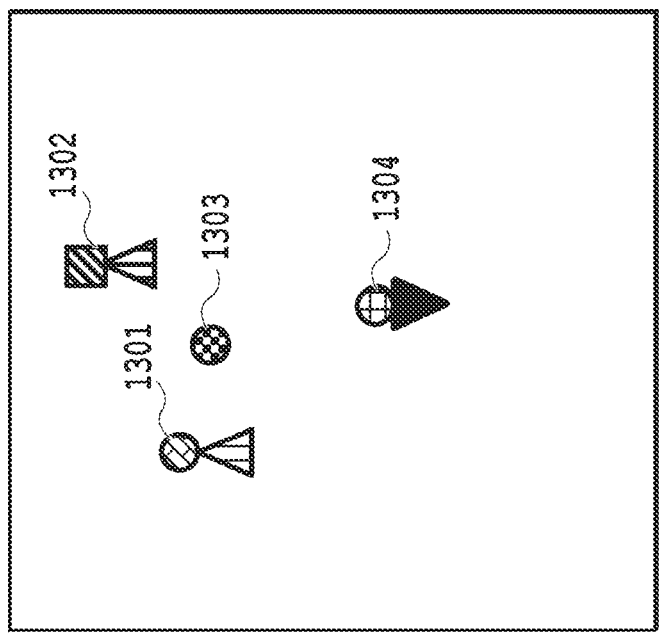
Figure 14:
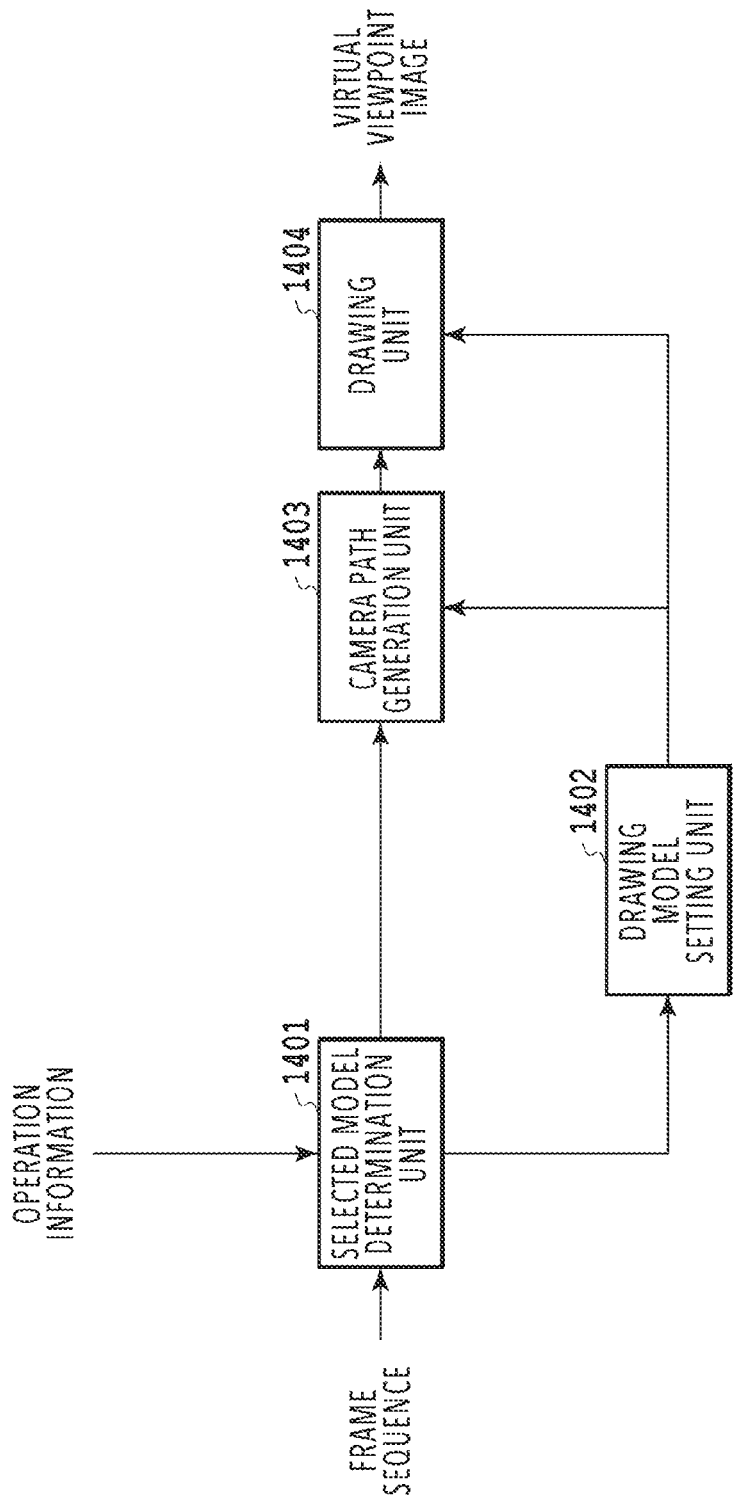
FIG. 14 is a block diagram showing a software configuration of an information processing apparatus.
Figure 15:
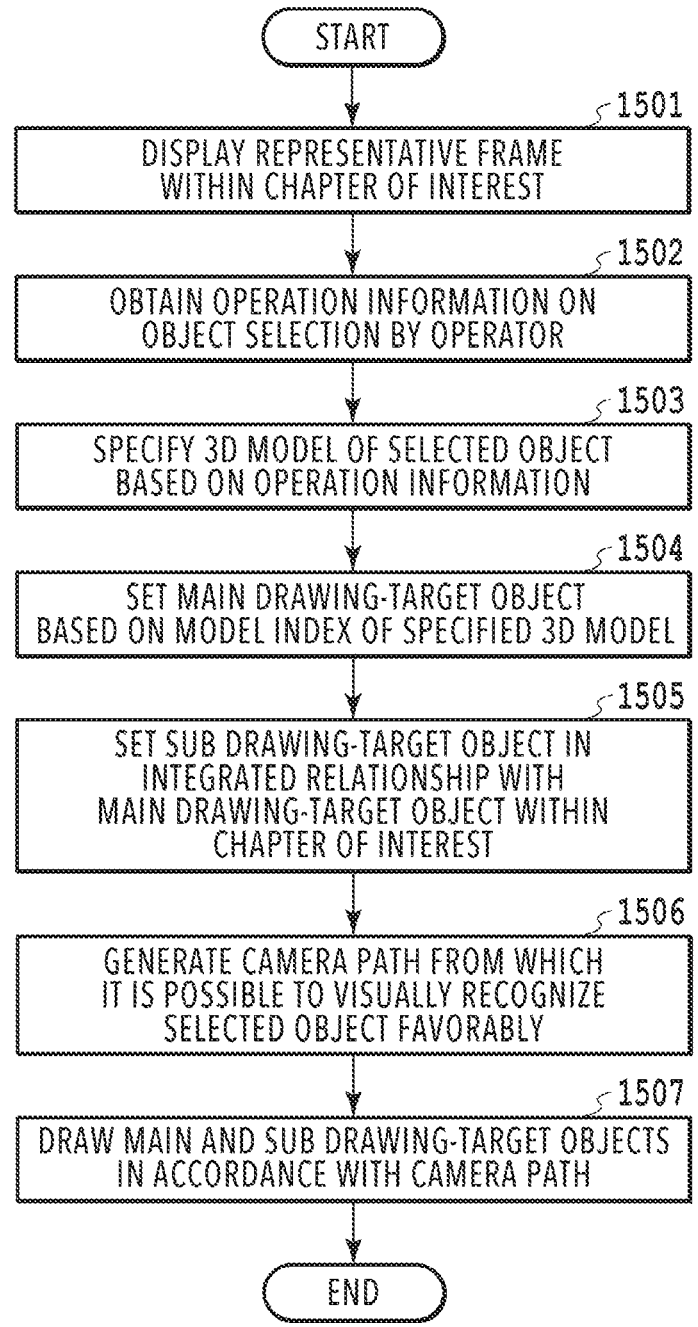
FIG. 15 is a flowchart showing a flow of processing to selectively reproduce an object.

FIG. 13A and FIG. 13B are each a diagram showing an example of a UI screen that an operator uses, FIG. 14 is a block diagram showing a software configuration (function configuration) of the information processing apparatus 100, and FIG. 15 is a flowchart showing a flow of selective reproduction processing. The various functions shown in FIG. 14 are implemented by the CPU 101 executing dedicated programs. In the following, object selective reproduction utilizing metadata of the volumetric video is explained with reference to the block diagram in FIG. 4 and the flowchart in FIG. 15. In the following explanation, a symbol "S" means a step.

At S1501, data of the reproduction-target volumetric video is read from the HDD 105, or the like, and, based on instructions of an operator, a user interface screen (UI screen) displaying the frame of interest of the chapter of interest is displayed on the display. In a case when the operator designates the chapter the operator desires to view from the chapters constituting the volumetric video on the UI screen, in FIG. 13A, the representative frame (for example, the top frame) within the designated chapter is displayed on the UI screen. The operator selects the desired object (here, object 1301 whose attribute is "person", whose player's name is "goto", and whose team to which the object 1301 belongs is "team A") from the objects existing within the UI screen by using a mouse, or the like.

At S1502, the operation information on the operator selecting an arbitrary object via the input device 107 is obtained. For example, in a case when it is detected that a click operation is performed in the state where the mouse is held over an arbitrary object among the objects existing on the UI screen in FIG. 13A, the information on the detected click operation is obtained.

At S1503, a selected model determination unit 1401 specifies the 3D model of the object selected by the operator based on the operation information obtained at S1502. Specifically, the mesh model in the forefront that collides with the ray corresponding to the pixel position indicated by the operation information is specified as the mesh model of the object selected by the operator. It may also be possible to set the selection condition in advance and to specify the mesh model of the automatically selected object.

At S1504, a drawing model setting unit 1402 sets the global object, which is the main drawing target, based on the model index of the 3D model specified at S1503. Specifically, the drawing model setting unit 1402 refers to ancillary information "GO" as metadata and sets the global object corresponding to the chapter object of the model index of the 3D model specified at 1503 as the object of the main drawing target.

At S1505, the drawing model setting unit 1402 sets the global object, which is the sub drawing target, from the other global objects within the chapter of interest. Specifically, the drawing model setting unit 1402 refers to ancillary information "Conv" as metadata and sets the global object in the integrated relationship with the global object that is set as the main drawing target object at S1504 as the object of the sub drawing target.

At S1506, a camera path generation unit 1403 generates information (camera path) indicating the movement path of the virtual viewpoint within the chapter of interest, from which it is possible to visually recognize the object selected by the operator favorably. For generation of the camera path, the information (object position, attribute, circumscribed rectangle of mesh model) within the metadata of the global object that is set as the main drawing target is used. For example, in a case when the attribute is a person, the camera path generation unit 1403 selects and generates the camera path that captures the selected object from the front, the camera path that captures the selected object from behind, the camera path that reproduces the line of sight of the person (player), and the like, based on user instructions, and the like. Further, in a case when the attribute is ball, the camera path generation unit 1403 generates, for example, the camera path from which the entirety of the image capturing space (for example, the entire surface of field) is viewed laterally, the camera path from which it is viewed from directly above, the camera path from which the ball and the goal are always within the viewing angle, and the like, based on user instructions, and the like. Alternatively, it may also be possible to generate a camera path by receiving operation information designating the position and orientation of the virtual viewpoint (virtual camera) from a virtual viewpoint controller, not shown schematically, via the network I/F 110.

At S1507, a drawing unit 1404 performs drawing processing by using the 3D model of the drawing-target global object that is set at S1504 and S1505 in accordance with the camera path generated at S1506.

FIG. 13B shows an example of the drawing results in a case when the player 1301 is selected on the UI screen in FIG. 13A. In the example in FIG. 13B, the object 1301 and an object 1302 of the players, and an object 1303 of the ball, for which there exists an instant of being integrated together, are drawn/displayed. However, an object 1304 of the player, for whom there exists no instant of being integrated with another player or the ball is not drawn/displayed. The integration here means that a plurality of objects is represented by one mesh model. Then, the information on the attribute and tag of the object 1301 of the player, who is the selected object, is displayed on the top-left screen based on the metadata. As described above, by drawing/displaying also the non-selected object, for which there exists an instant of being integrated with the object selected by the operator, it is possible to prevent the virtual viewpoint image from becoming one with a sense of incongruity. That is, in a case when the non-selected object is displayed only in the frame at the instant at which the selected object and another object come into contact with each other, the object that does not exist in the previous frame appears suddenly. A viewer will have a great sense of incongruity for such a video, and, therefore, in order to prevent this, it is desirable to perform the drawing/display control as described above. Further, it may also be possible to figure out ways to prevent the selected object from being blocked by the non-selected object, for which there exists an instant of being integrated with the selected object, in the frame at the time at which the 3D model is not integrated, by drawing/displaying the non-selected object semitransparent, for example.

The above is the flow of the processing to selectively reproduce an arbitrary object by utilizing a volumetric video to which the type two metadata is added.

Modification Example

In the above-described embodiment, the system configuration is explained, which supposes that the data of a metadata-added volumetric video is in the client environment of an operator, but the system configuration is not limited to this. For example, a system configuration may be accepted in which the entity of data is on the server environment, and the results of performing processing in the server environment in accordance with the operation of an operator are received and viewed on a client PC on the operator side. Further, in a case when the mesh model is transferred from a server at the time of performing selective reproduction of an arbitrary object on the client PC, it is also possible to reduce the communication load by transferring only 3D shape data of the selected object.

As above, according to the present embodiment, metadata that associates an object and a mesh model with each other is generated, and the metadata is added to the frame sequence of a volumetric video to be provided. In the volumetric video data having the format such as this, it is possible to efficiently perform selective drawing of a specific object in accordance with a virtual viewpoint. Further, it is made possible to flexibly deal with also a case when a plurality of objects is represented by one 3D model at a certain instant.

Other Embodiments

Embodiment(s) of the present disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

According to the technique of the present disclosure, it is made possible to easily perform selective drawing of a specific object.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An information processing apparatus comprising:
   one or more memories storing instructions; and
   one or more processors executing the instructions:
   to obtain volumetric video data consisting of a sequence of frames, each frame including object shape data, and the volumetric video data including metadata that associates each of the objects and the shape data in each frame;
   to select a specific object based on the obtained volumetric video data;
   to generate a camera path indicating a movement path of a virtual viewpoint from which it is possible to visually recognize the selected specific object favorably, based on at least one piece of information of information regarding a three-dimensional position and an attribute of the object included in the metadata relating to the selected specific object and a circumscribed rectangle of a three-dimensional shape indicated by the shape data;
   to set one or a plurality of objects at least including the selected specific object as a drawing target based on the metadata added to the volumetric video data; and
   to perform drawing using the shape data associated with the one or the plurality of objects set as the drawing target, based on the generated camera path and the metadata added to the volumetric video data.

2. The information processing apparatus according to claim 1, wherein, to select the specific object, an object corresponding to a pixel position designated by an operator is selected on a user interface screen displaying an image of an arbitrary frame of a sequence of frames constituting the volumetric video data.

3. The information processing apparatus according to claim 1, wherein, to select the specific object, when information indicating that the selected specific object is in an integrated relationship with another object is included in the metadata, the specific object and the other object are set as the drawing target.

4. The information processing apparatus according to claim 1, wherein, to generate the camera path, in a case when the attribute is a person, one of a camera path that captures the selected specific object from the front, a camera path that captures the object from behind, and a camera path that reproduces a line of sight of the person, is generated.

5. The information processing apparatus according to claim 1, wherein, to generate the camera path, in a case when the attribute is a thing, one of a camera path from which an entirety of an image capturing space is viewed laterally, a camera path from which the entirety is viewed from directly above, and a camera path from which the thing and another specific thing are always included within a viewing angle, is generated.

6. An image processing method comprising the steps of:
   obtaining volumetric video data consisting of a sequence of frames, each frame including object shape data, and the volumetric video data including metadata that associates each of the objects and the shape data in each frame;
   selecting a specific object based on the obtained volumetric video data;
   generating a camera path indicating a movement path of a virtual viewpoint from which it is possible to visually recognize the selected specific object favorably, based on at least one piece of information of information regarding a three-dimensional position and an attribute of the object included in the metadata relating to the selected specific object and a circumscribed rectangle of a three-dimensional shape indicated by the shape data;
   setting one or a plurality of objects at least including the selected specific object as a drawing target based on the metadata added to the volumetric video data; and
   performing drawing using the shape data associated with the one or the plurality of objects set as the drawing target, based on the generated camera path and the metadata added to the volumetric video data.

7. A non-transitory computer readable storage medium storing a program for causing a computer to perform an image processing method comprising the steps of:
   obtaining volumetric video data consisting of a sequence of frames, each frame including object shape data, and the volumetric video data including metadata that associates each of the objects and the shape data in each frame;
   selecting a specific object based on the obtained volumetric video data;
   generating a camera path indicating a movement path of a virtual viewpoint from which it is possible to visually recognize the selected specific object favorably, based on at least one piece of information of information regarding a three-dimensional position and an attribute of the object included in the metadata relating to the selected specific object and a circumscribed rectangle of a three-dimensional shape indicated by the shape data;
   setting one or a plurality of objects at least including the selected specific object as a drawing target based on the metadata added to the volumetric video data; and
   performing drawing using the shape data associated with the one or the plurality of objects set as the drawing target, based on the generated camera path and the metadata added to the volumetric video data.

* * * * *